(12) United States Patent
Burke

(10) Patent No.: US 7,524,364 B2
(45) Date of Patent: Apr. 28, 2009

(54) METHOD AND APPARATUS FOR DRAINING PNEUMATIC SYSTEMS

(75) Inventor: James R. Burke, 8107 W. 71st Pl., Arvada, CO (US) 80004

(73) Assignee: James R. Burke, Arvada, CO (US)

( * ) Notice: Subject to any disclaimer, the term of this patent is extended or adjusted under 35 U.S.C. 154(b) by 434 days.

(21) Appl. No.: 11/370,436

(22) Filed: Mar. 7, 2006

(65) Prior Publication Data

US 2006/0201023 A1      Sep. 14, 2006

Related U.S. Application Data

(60) Provisional application No. 60/659,806, filed on Mar. 8, 2005.

(51) Int. Cl.
*F16T 1/00*      (2006.01)

(52) U.S. Cl. ............ 96/109; 96/117; 55/DIG. 17; 34/573; 137/559

(58) Field of Classification Search ........... 96/109–111, 96/115, 117, 117.5; 95/1; 55/DIG. 17; 34/573; 137/559, 624.27; 73/73–77

See application file for complete search history.

(56) References Cited

U.S. PATENT DOCUMENTS

| | | | |
|---|---|---|---|
| 3,107,645 A | | 10/1963 | Monroe et al. |
| 5,014,735 A | | 5/1991 | Cummings |
| 5,113,892 A | | 5/1992 | Hull et al. |
| 5,205,315 A | * | 4/1993 | Margerum ............ 137/204 |
| 5,435,422 A | * | 7/1995 | Chille, Sr. ............ 188/352 |
| 5,749,391 A | | 5/1998 | Loutzenhiser |
| 5,826,575 A | * | 10/1998 | Lall ............ 128/205.12 |
| 6,272,904 B1 | * | 8/2001 | Neely et al. ............ 73/49.7 |

OTHER PUBLICATIONS

Young, "International Search Report of International (PCT) Patent Application No. PCT/US06/08246", ISA/US, mailed Jul. 11, 2007, pp. 1-3.
Young, "Written Opinion of International (PCT) Patent Application No. PCT/US06/08246", ISA/US, mailed Jul. 11, 2007, pp. 1-5.
Young "International Preliminary Report on Patentability for International (PCT) Patent Application No. PCT/US06/08246", ISA/US, issued Sep. 12, 2007, pp. 1-8.

* cited by examiner

*Primary Examiner*—Frank M Lawrence
(74) *Attorney, Agent, or Firm*—Sheridan Ross P.C.

(57) ABSTRACT

Methods and apparatuses for determining the condition of a pneumatic system air dryer are provided. An output of the pneumatic valve or of a conduit interconnected to the outlet of the pneumatic valve is positioned such that a discharge passed through the pneumatic valve while the valve is open is in view of an operator and/or is directed to a moisture sensor. Moreover, the discharge and/or an output device interconnected to the moisture sensor is in view of the operator while the operator is in a position to operate the pneumatic valve. An observation volume with a sight glass or window and/or a moisture sensor can be provided to facilitate the observation or detection of moisture or oil in the discharge.

26 Claims, 9 Drawing Sheets

METHOD AND APPARATUS FOR DRAINING PNEUMATIC SYSTEMS

CROSS REFERENCE TO RELATED APPLICATIONS

This application claims the benefit of U.S. Provisional Patent Application No. 60/659,806, filed Mar. 8, 2005, the entire disclosure of which is hereby incorporated herein by reference.

FIELD

The present invention is directed to the draining of pneumatic systems. In particular, the present invention is directed to draining pneumatic systems in connection with determining the status of pneumatic system components and minimizing condensate build-up in the reservoirs of pneumatic systems.

BACKGROUND

Pneumatic systems, such as air brakes and air accessories on heavy trucks, and air powered tools in workshops, can provide reliable power for a variety of purposes. In connection with pneumatic systems, reservoirs or tanks are often used to accumulate and store compressed air so that compressed air is immediately available when required. Because the supply reservoir on vehicles or the storage tank in stationary compressors provides an expansion volume with respect to air that is leaving a compressor, water vapor that is taken in with air at the inlet to the compressor tends to condense in the supply reservoir or storage tank.

It is desirable to prevent moisture from entering pneumatic systems and to remove water that has succeeded in entering such systems for a number of reasons. For example, because liquid water is incompressible, water that collects in a supply reservoir decreases the volume of that reservoir available for compressed air. As a result of the decreased volume, less air is available instantaneously in response to demand, and increased input of compressed air from a compressor may be required. This reduced volume can compromise the safety of brake systems. Where temperatures drop below freezing, valves and other components in the system can stick. Another reason for keeping water out of pneumatic systems is that the reservoirs and other components of a pneumatic system are often made from steel. Accordingly, water in such systems can cause components to rust. The formation of rust can deteriorate components and lead to failure. In addition, rust in the system can contaminate and interfere with the operation of valves, actuators and other components.

In order to prevent water from entering pneumatic systems in the first place, air dryers may be installed. In a typical system incorporating an air dryer, the outlet from the compressor sends compressed air through an air dryer cartridge before that compressed air is provided to supply tanks and the remainder of the system. The air dryer assembly typically contains a cartridge filled with desiccant material. For example, an air dryer cartridge may be filled with a large number of small desiccant beads that the compressed air must pass through before reaching the remainder of the system. In order to prevent the desiccant inside the air dryer cartridge from becoming saturated with water removed from incoming air, the volume defined by the air dryer assembly is periodically purged. For example, purging may be performed when air pressure within the system reaches a predetermined level, for example as determined by a compressor governor, and additional input from the compressor is halted. In general, purging consists of opening an exhaust or purge valve on the air dryer assembly to release collected pressurized air and using that pressurized air to clean the desiccant in the cartridge and to remove moisture from the air dryer assembly. Because the desiccants available for air dryer applications can be used for many cycles of moisture collection and purging, air dryer systems can be effective at preventing moisture from entering pneumatic systems.

However, the ability of an air dryer cartridge to remove moisture from compressed air is adversely impacted by contaminants. In particular, by design, air compressors often introduce oil to the remainder of the pneumatic system with the air compressed by the compressor. Such oil is removed by the air dryer. However, desiccant material that becomes coated with oil is no longer effective at removing moisture from incoming air. Although purge cycles can remove some of the oil from the cartridge, the desiccant material will eventually become loaded with oil, and incapable of preventing moisture from entering the supply tank and the remainder of the system. If the air dryer desiccant material becomes completely coated with oil, oil will begin to be passed into the remainder of the pneumatic system.

The introduction of oil into a pneumatic system is problematic, because pneumatic systems typically incorporate a number of rubber components. These components are degraded by contact with petroleum products, such as the oil typically used to lubricate air compressors. Therefore, failure to timely replace an air dryer cartridge can lead to premature failure of other components in the system. For example, diaphragms, pistons and o-rings can deteriorate, causing leaks in the system and the failure of operating components. As the cost of components incorporated into pneumatic systems has increased, for example as antilock braking systems, vehicle dynamic control systems and the relatively expensive hardware associated with such systems have become more common and because of the safety features that these new systems provide, the need to prevent contaminants in pneumatic systems has increased.

When an air dryer is no longer effective at removing moisture, for example because the desiccant has become approximately 85 to 90% coated with oil, water will begin to collect in the supply tank. The detection of water in the supply tank is an indication that the air dryer cartridge should be replaced. Therefore, operators of pneumatic equipment are usually instructed to drain the supply tank daily (for example nightly), to check for the appearance of water in the stream of air leaving the supply reservoir as it is drained, as an indication that the air dryer needs to be serviced. In actual practice, regular draining of supply reservoirs is often not performed. In particular, the drain valves for supply reservoirs are, by necessity, positioned at or adjacent the lowest point of the supply reservoir. As a result, it can be inconvenient for an operator to access the valve. For instance, in connection with a heavy vehicle, the drain valve may be located underneath the vehicle, or between the vehicle's frame rails. Accessing the drain valve of the vehicle supply reservoir is particularly problematic in connection with vehicles having faired-in chassis, for example in connection with trucks having aerodynamic bodywork, buses or in connection with vehicles having specialized compartments, such as fire trucks. Similar problems can also occur in connection with stationary pneumatic systems having large supply reservoirs and drain valves located close to the floor or other support surface underneath the supply reservoir.

In order to facilitate the draining of supply reservoirs, drain valves allowing remote activation are available. For example, spring loaded valves that can be opened by pulling a lanyard are available. Automatic drain valves that drain the tank periodically, such as by allowing small amounts of air and collected water to exit the tank when pressure in the tank has reached a predetermined amount are also available. However, such systems do not assist in achieving the diagnostic function of observing the discharge from a supply reservoir. In particular, in connection with valves allowing remote actuation, the outlet is typically located some distance from the actuation point. That is, it can remain inconvenient for an operator to observe the discharge from the supply reservoir, even though the action required to open the valve may have been facilitated. Automatic drain valves, because they function autonomously, while the system is in operation, usually operate unobserved. Therefore, the diagnostic function of observing the discharge from a supply reservoir is effectively unavailable when conventional remotely activated drain valves or automatic drain valves are used.

Because operators often do not regularly drain supply reservoirs and/or observe the discharge from such reservoirs, and because of the need to prevent contaminants and oil from entering the pneumatic system, conservative maintenance schedules with respect to air dryer components have been devised. As a result, preventative maintenance schedules can call for frequent replacement of air dryer cartridges in order to prevent damage to other pneumatic system components. However, preventative maintenance schedules based on the passage of time or hours of operation since the air dryer cartridge was last replaced do not necessarily correlate well with the effective life of the air dryer cartridge. For example, needless expense may be incurred as a result of replacing air dryer cartridges more often than is necessary. As another example, such preventative maintenance schedules may not require replacement of the air dryer cartridge soon enough, such as when a compressor is by-passing more than a normal amount of oil.

SUMMARY

The present invention is directed to solving these and other problems and disadvantages of the prior art. In accordance with embodiments of the present invention, a user actuated drain valve is provided in combination with a drain tube or conduit with an opening proximate to or in view of a person operating the remote activation switch for the drain valve. Accordingly, the operator can easily operate the drain valve and can easily observe the discharge of the supply reservoir through the attached conduit. As an example, the drain valve comprises an electronically controlled solenoid valve.

In accordance with further embodiments of the present invention, the actuator for the drain valve is associated with a timer. In particular, by selecting activation of the drain valve, the timer may hold the drain valve open for a predetermined period of time. This period of time may be selected such that the valve will be held open long enough to drain the tank completely, in order to avoid leaving moisture in the tank that could cause a false indication that the air dryer should be serviced during a later activation of the drain valve. In accordance with embodiments of the present invention, the timer comprises an electromechanical system. Alternatively, the timer may comprise an electronic, including an analog or digital, timing circuit. As still another alternative, the timer may be implemented mechanically.

Embodiments of the present invention provide a method for determining the condition of an air dryer. According to one such embodiment, a first end of a conduit is interconnected to the outlet of a valve on a pneumatic system supply reservoir. The second end of the conduit is routed to a location at which it can be seen, or at least a discharge from the conduit can be seen, by an operator. In addition, a valve activation switch is located such that it is easy to reach, for example so that it can be operated by the operator while the operator has the outlet of the conduit in view or such that the switch can be operated while the operator observes the discharge from the conduit. The activation switch sends a mechanical or electronic signal to the valve causing the valve to open.

In accordance with further embodiments of the present invention, the method includes holding the valve on the supply reservoir in an open position for at least a predetermined period of time. Holding the valve open for at least a first predetermined period of time may be accomplished by providing a timing mechanism that operates in response to an activation signal entered by the user at the activation switch.

In accordance with another such embodiment, a first end of a conduit is interconnected to a pneumatic system supply reservoir such that the conduit is in communication with the supply reservoir volume. The second end of the conduit is interconnected to a valve. The valve outlet, or an outlet of another conduit in communication with the valve outlet, is located so that an operator can observe the discharge from the conduit upon opening the valve. Opening the valve can be effected by the operator pressing a momentary switch that operates a timer that in turn acts to hold the valve open for a predetermined period of time. Alternatively, the activation switch may hold the valve open for as long as it is pressed or otherwise activated by the operator. The valve and valve activation switch can be part of an integrated assembly that is placed in a location that is easily accessed and viewed by the operator. In addition, the discharge may be directed past a sight glass or window, to facilitate the observation of any moisture in the discharge by the operator. In accordance with still other embodiments, a sight glass or window past which a discharge from a supply reservoir is directed can be provided as part of a unit that is separate from the valve that is operated in order to release the discharge.

In accordance with still other embodiments of the present invention, a moisture sensor may be positioned at or near the outlet of the pneumatic valve or of a conduit in communication with the valve outlet. If moisture in the discharge is detected by the sensor, an output signal may be provided to the operator. In accordance with still other embodiments of the present invention, a moisture sensor may be used in cooperation with or provided as part of an integrated assembly for detecting moisture in a pneumatic system as described herein. Embodiments using a moisture sensor can be used to facilitate the detection of moisture in a pneumatic system for determining the condition of an air dryer where the supply tank of the pneumatic system is far enough away from an easily operator-accessible location that the length of conduit that would be required to direct the discharge to an area near the operator would effectively remove the moisture from the discharge. Accordingly, the use of a moisture sensor is particularly applicable in connection with rear-engined vehicles. In addition, the use of a moisture sensor can allow for or facilitate an "in-cab" system for determining the condition of the air dryer, in which an operator switch and a signal device are located such that they can be activated and read from the operator's normal operating location.

Embodiments of the present invention may also operate automatically. For instance, a pneumatic valve in communication with a pneumatic system supply reservoir may be held open for a predetermined period of time to drain the supply reservoir each time the pneumatic system is switched off, or each time the ignition switch of a vehicle associated with the pneumatic system is switched off. Such an embodiment may be combined with an embodiment that includes a moisture sensor and a signal device or output, to alert the operator if moisture in the pneumatic system is detected, so the operator knows whether the air dryer should be serviced.

Additional features and advantages of embodiments of the present invention will become more readily apparent from the following discussion, particularly when taken together with the accompanying drawings.

DETAILED DESCRIPTION

Figure 1:
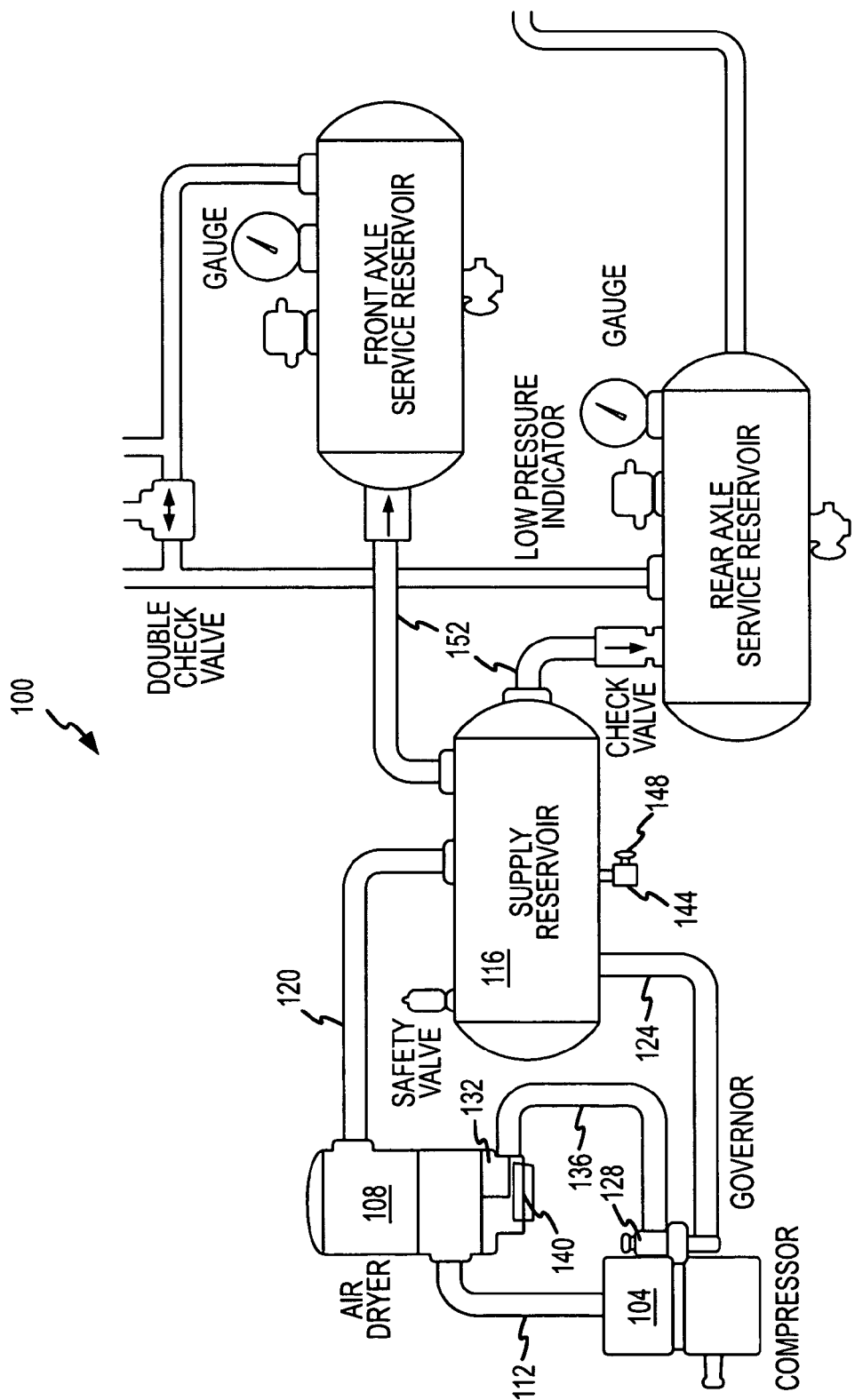
FIG. 1 is a schematic representation of portions of an exemplary pneumatic system.

With reference now to FIG. 1, portions of an exemplary pneumatic system 100 are illustrated in schematic form. In general, the pneumatic system 100 includes a compressor 104. The compressor may be driven by various means. For example, where the pneumatic system 100 is part of a heavy vehicle, the compressor 104 may be driven by the vehicle's engine. In connection with a pneumatic system 100 in a stationary application, the compressor may be driven by a dedicated engine or electric motor. Of course, other configurations are possible. In a typical arrangement, the compressor 104 takes air from the atmosphere, compresses it using one or more pistons, and provides the compressed air to the remainder of the pneumatic system 100. In the exemplary system 100 shown in FIG. 1, air compressed by the compressor 104 is provided to an air dryer 108 via a supply line 112.

The air dryer 108 generally comprises a cartridge that is at least partially filled with a desiccant, in order to remove moisture, oil and contaminants from the air provided by the compressor 104. Accordingly, as can be appreciated by one of skill in the art, the air dryer 108 may include a replaceable cartridge that contains a large number of desiccant beads. In addition, the air dryer 108 may incorporate a pre-filter for removing much of the oil and other contaminants before the air from the compressor 104 is allowed to contact the desiccant. As can further be appreciated by one of skill in the art, a pre-filter may be provided as part of a replaceable cartridge that also contains the desiccant. After the air compressed by the compressor 104 has passed through the air dryer 108, it is passed to the supply reservoir 116 via supply line 120.

Provided that the air dryer 108 is functioning properly, the air provided to the supply reservoir 116 is substantially free of water vapor. In addition, the air supplied should be substantially free of oil and other contaminants.

In general, operation of the compressor 104 is controlled in response to the air pressure in the pneumatic system 100. For instance, in the example system 100 shown in FIG. 1, the operation of the compressor 104 is controlled based on the detected pressure within the supply reservoir 116. More particularly, signal line 124, which is in communication with the interior of the supply reservoir 116, provides a pressure signal to a governor 128. When the air pressure within the supply reservoir 116 reaches the predetermined level, the governor 128 will cause the supply of compressed air from the compressor 104 to be discontinued. In the case of a pneumatic system 104 provided as part of a heavy truck, the compressor 104 may be driven continuously while the vehicle's engine is in operation. Accordingly, discontinuing the supply of compressed air may comprise holding the intake valves of the compressor 104 in an open position so that air drawn in by the compressor's pistons is simply pushed back out the intake valves, rather than being pushed through the exhaust valves and into the remainder of the pneumatic system 100. In the case of a pneumatic system 100 driven by a dedicated motor, such as in a stationary system, the governor may operate to stop the compressor drive motor when it has determined that the pressure within the supply reservoir 116 has reached the predetermined level.

In addition to stopping the supply of compressed air when the pressure within the supply reservoir 116 has reached the predetermined level, the governor 128 controls operation of the air dryer 108 purge valve 132 via signal line 136. The purge valve 132 is generally located in the sump 140 of the air dryer 108. In an exemplary embodiment of the present invention, the signal passed by signal line 136 is an air signal that causes the purge valve 132 to open when the governor 128 detects that the predetermined air pressure in the supply reservoir 116 has been reached. Accordingly, at about the time the compressor 104 stops providing compressed air to the remainder of the system 100, the purge valve 132 is opened. When the purge valve 132 is opened, compressed air held within the internal volume of the air dryer 108 (and/or held within an external purge tank or supply/secondary tank) exits the air dryer 108. As the air exits, excess water on the surface of the desiccant material and/or in the sump 140 is also removed. In addition, at least some oil and other contaminants can be removed. Accordingly, purging helps to maintain the operational efficiency of the air dryer 108.

Eventually, because the compressor 104 typically bypasses a small amount of oil during normal operation, the desiccant material within the air dryer 108 will become loaded with oil, and unable to remove moisture from the air. More particularly, oil coated desiccant loses its ability to capture, hold and then release water molecules. Furthermore, purging of the air dryer 108 may not be effective, or may no longer be effective, at clearing oil from the desiccant material. As a result, the effectiveness of the air dryer 108 typically decreases with use.

Once the air dryer 108 is no longer able to efficiently remove moisture from the air because most of the desiccant is coated with oil, water will begin to collect in the supply reservoir 116. Accordingly, one common term for the supply reservoir 116, which represents the first expansion volume within the pneumatic system 100 after the air dryer 108 itself, is the "wet tank." As a result, proper maintenance of a pneumatic system 100 includes periodically opening a drain valve 144, typically located at a low point on the supply reservoir 116. If water is seen being discharged from the drain valve 144, it is an indication that the air dryer 108 requires servicing. For example, it may be taken as an indication that an air dryer cartridge needs to be replaced. Because of this important diagnostic function, operators of pneumatic systems are advised to fully drain the supply reservoir 116 periodically. For example, operators of heavy vehicles or of stationary pneumatic systems are typically advised to drain the supply reservoir 116 of the system daily. However, operators may not follow the recommended practices, for example because the drain valve 144 and the associated valve handle 148 are difficult to access. Specifically, because the drain valve 144 must be located at a low point on the supply reservoir 116, and because the supply reservoir 116 may be difficult to access in the first place, it may be difficult to even reach the supply valve handle 148. Furthermore, even if remote actuation mechanisms are provided, it is difficult with conventional systems to observe the discharge from the drain valve 144.

As noted elsewhere herein, it is desirable to prevent moisture from entering the remainder of the pneumatic system, for example by passing through the air dryer 108 and exiting the supply reservoir 116 through one or more outlets 152. As also noted elsewhere herein, it is particularly important to prevent the introduction of oil bypassed by the compressor 104 to components of the pneumatic system 100 downstream of the air dryer 108. Because the presence of water in the supply reservoir 116 indicates that the air dryer 108 is losing its effectiveness, and because such loss of effectiveness is typically due to loading of the desiccant material with oil, the air dryer 108 should be serviced once water is detected in the supply reservoir 116.

Figure 2:
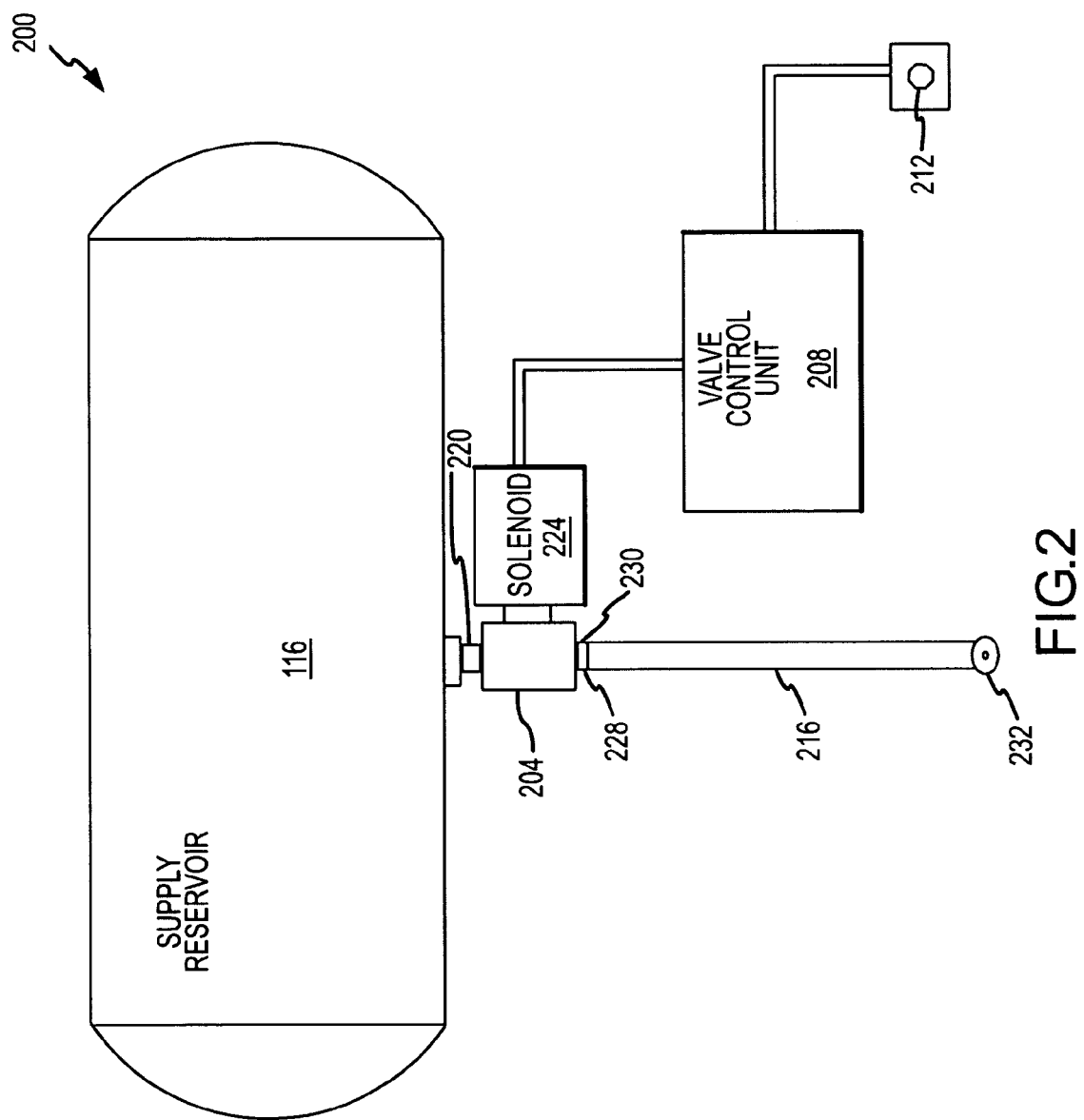
FIG. 2 is a schematic diagram of components of a system for determining the condition of an air dryer in accordance with embodiments of the present invention.

With reference now to FIG. 2, components of a system or apparatus 200 for determining the condition of an air dryer of a pneumatic system in accordance with embodiments of the present invention are illustrated. In general, the system includes a pneumatic drain valve 204 interconnected to a supply reservoir 116, a valve control unit 208, and a valve activation switch 212. In addition, the system or apparatus 200 includes a drain tube or conduit 216.

The drain valve 204 may have an inlet that is interconnected to the drain outlet 220 of the supply reservoir 116 conventionally, for example by providing threads as part of the drain valve 204 that are matched to threads provided on or as part of the drain tube outlet 220. However, in other respects, the drain valve 204 differs from drain valves conventionally used in connection with supply reservoirs 116. For example, the drain valve 204, in accordance with embodiments of the present invention, may be operated in connection with a valve control unit 208 that functions to hold the drain valve 204 open for a predetermined period of time. Alternatively, the valve control unit 208 may function to hold the drain valve 204 open until the pressure in the supply reservoir 116 has dropped to below a predetermined pressure. For example, an operator may use the valve control switch 212 to send a signal to the valve control unit 208 to open the drain valve 204. The input provided by the operator may comprise pushing a switch or otherwise providing a momentary control input. In response to the control input, the valve control unit 208 may open the valve 204, for example by providing a signal to a valve actuator solenoid 224 that provides the mechanical input required to operate the valve 204. In accordance with embodiments of the present invention, energizing the solenoid 224 opens the valve 204 (i.e., the solenoid actuated valve is normally closed). In addition, the valve control unit 208 may initiate operation of a timer and continue to hold the valve 204 open for a predetermined period of time controlled by the operation of the timer. By way of example and not limitation, the predetermined period of time may be about two minutes. In this way, the valve 204 may be held open automatically for a period of time deemed sufficient to allow any water that has collected in the supply reservoir 116 to exit out of an outlet of the drain valve 204, along with all of the air in the tank. That is, in response to input from an operator signaling that the valve 204 should be opened, the system for draining the pneumatic system holds the valve 204 open for a predetermined period of time. As a further example, the valve control unit 208 may hold the valve 204 open until the pressure in the supply reservoir is about equal to atmospheric pressure.

The drain valve 204 in accordance with certain embodiments of the present invention also differs from conventional drain valves 144 in that a valve outlet 228 comprising an outlet stub 230 or other structure that facilitates the interconnection of the drain tube 216 to the drain valve 204 is provided. The drain tube 216 is routed so that the outlet 232 of the drain tube 216 is near or readily in view of an operator when the valve activation switch 212 is operated. Accordingly, the drain tube 216 has a first end that is interconnected to the valve outlet stub 228, and a second end or outlet 232 that is positioned so that any moisture or other material discharged from the supply reservoir 116 when the valve 204 is opened is readily visible to the operator.

Figure 3:
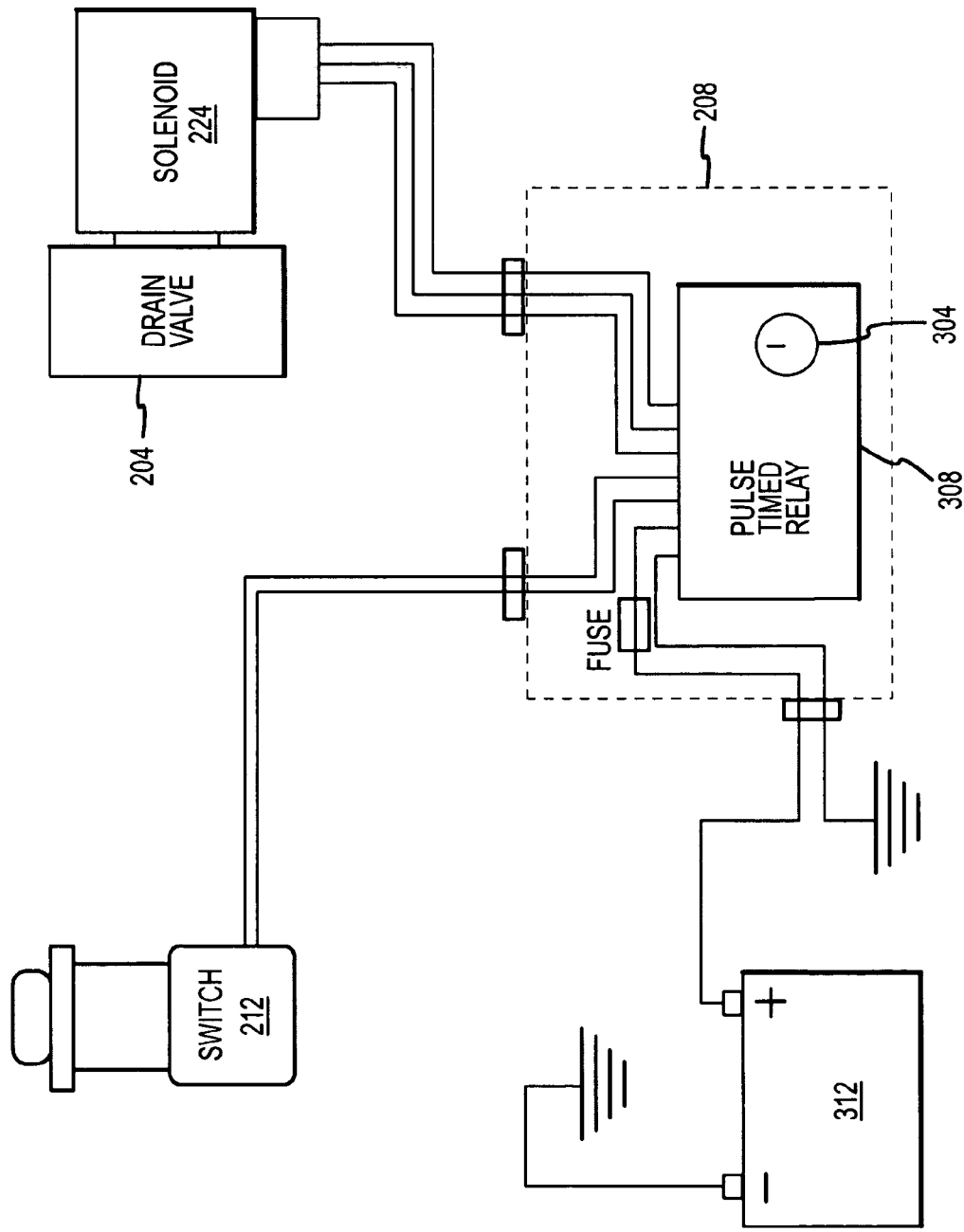
FIG. 3 is a block diagram depicting components of a system for determining the condition of an air dryer in accordance with embodiments of the present invention.

With reference now to FIG. 3, automatic valve activation components that may be associated with a system for determining the condition of an air dryer of a pneumatic system 200 in accordance with embodiments of the present invention are illustrated. In general, the activation switch 212 is interconnected to a timer switch 304 provided as part of the valve control unit 208. The timer switch 304 may start the operation of a timer in response to a signal pulse or other momentary signal received from the activation switch 212. In accordance with embodiments of the present invention, the timer switch 304 may be implemented as an integrated circuit, such as an off-the-shelf timer chip or pulse relay, or as discrete electronic components. The timer switch 304 may also comprise a mechanical timing mechanism or a combination electronic and mechanical timer.

The timer switch 304 may provide a signal to a relay switch 308 that may also be provided as part of the valve control unit 208. For example, the timer switch 304 may operate to continuously provide a signal to the relay switch 308 for the predetermined period of time that the valve 204 is to be maintained in an open position or mode. While such a signal is provided from the timer switch 304, the relay switch 308 may provide an operating signal to the valve's solenoid 224. As can be appreciated by one of skill in the art, it can be desirable to use a relay 308 in connection with the control of relatively powerful electrical components, such as certain solenoid valves. Alternatively, the timer switch 304 may be replaced or supplemented by a pressure switch, that operates to provide a signal to the relay switch 308 to hold the drain valve 204 open until the pressure in the supply reservoir 116 has dropped to a predetermined level. As shown in FIG. 3, power for operating the valve's solenoid may be taken from a power supply 312. For example, in connection with a pneumatic system 100 having a drain system 200 in accordance with embodiments of the present invention that are provided as part of a heavy vehicle, the power supply 312 may comprise the battery and charging system for the vehicle. In the case of a stationary pneumatic system, the power supply 312 may comprise line power. As can also be appreciated by one of skill in the art, components such as the timer switch 304 and activation switch 212 are generally also provided with electrical power, but the amount of power drawn by such components is much less than the relay switch 308 when operating to open the output valve 304 by activating the valve's solenoid 224.

Figure 4:
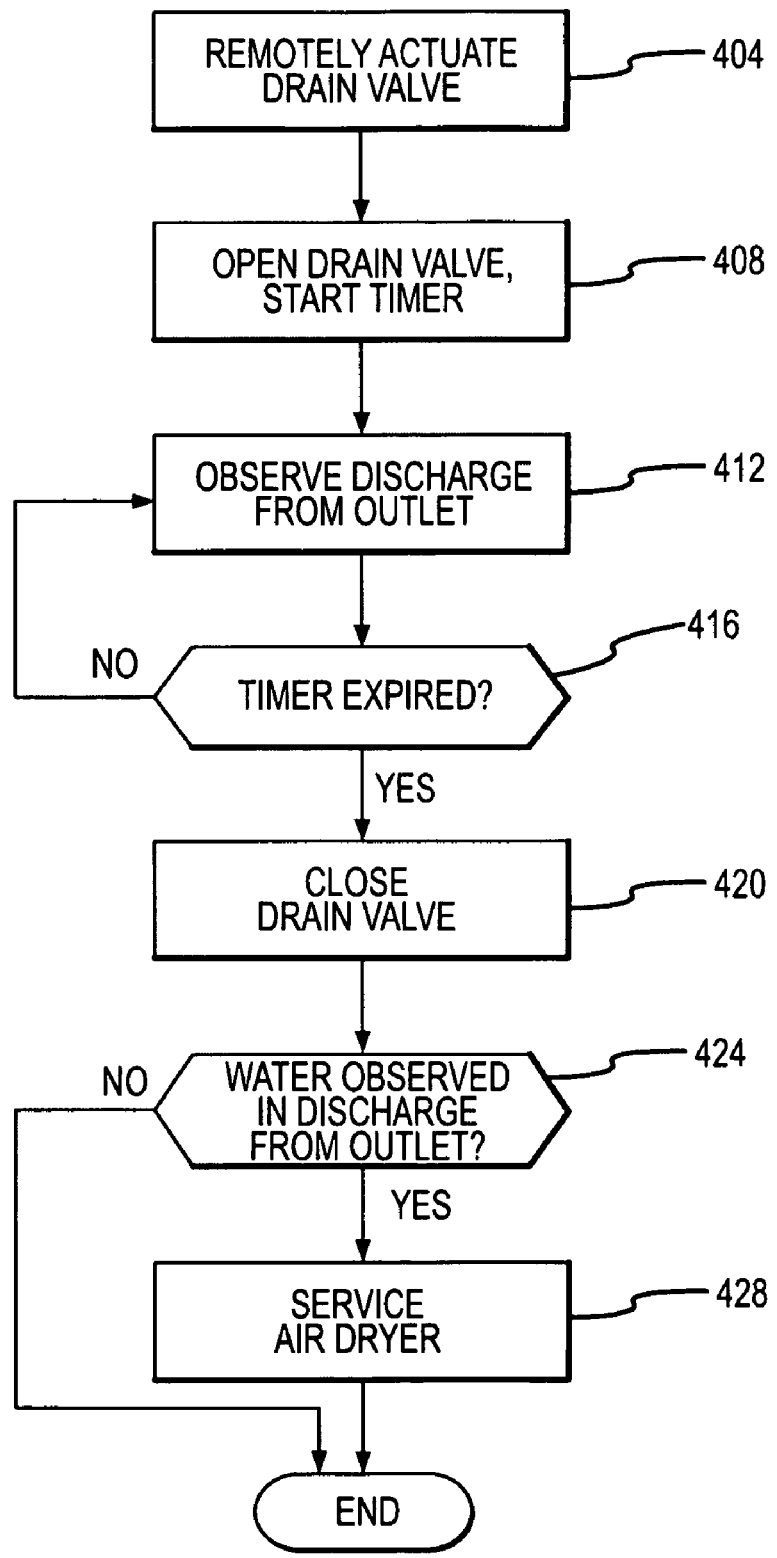
FIG. 4 is a flowchart depicting aspects of the operation of a system for determining the condition of an air dryer in accordance with embodiments of the present invention.

With reference now to FIG. 4, aspects of the operation of a system 200 for determining the condition of an air dryer of a pneumatic system in accordance with embodiments of the present invention are illustrated. Initially, at step 404, the operator remotely actuates the drain valve 204. In particular, this is performed by pressing a valve activation switch 212 that is located such that it can be easily accessed by the operator. For example, in connection with a heavy vehicle, the drain valve may be located near the driver's door, where it can be accessed by the operator while standing next to the vehicle.

In response to the signal to open the drain valve 204 received at the activation switch 212, the valve control unit 208 operates to open the drain valve 204. For example, the valve control unit sends a control signal to the relay switch 308 that in turn sends an operating signal to the valve's solenoid 224, causing the valve 204 to open, and the timer 304 is started (step 408). By causing the drain valve 204 to open, compressed air and other material that may have made its way into the supply reservoir 116 can exit the supply reservoir 116, and the operator observes the discharge from the drain tube outlet 232 (step 412). In accordance with embodiments of the present invention, the air and any other material exiting the supply reservoir 116 passes through the valve outlet 228, and into the drain tube 216. The outlet 232 of the drain tube 216 is positioned such that the discharge from the outlet 232 can be easily seen by the operator who has caused the drain valve 204 to open by pressing or otherwise activating the activation switch 212. Accordingly, the drain tube outlet 232 may be located next or proximate to the activation switch 212. In accordance with further embodiments of the present invention, the outlet 232 of the drain tube 216 may be located so that the discharge from the supply reservoir 116 is directed towards the ground and at a location visible to an operator near the activation switch. For example, the outlet 232 of the drain tube 216 may be positioned such that an operator standing next to the vehicle with their hand on the activation switch 212 can see the outlet 232 and/or the path of material leaving the outlet 232.

At step 416, a determination is made as to whether the timer has expired. In accordance with embodiments of the present invention, the timer operates to cause the relay switch 308 to hold the valve solenoid 224 in an open position for a predetermined period of time. The predetermined period of time may depend on various factors. As an example, the predetermined period of time may be from about one to about three minutes. If the timer has not expired, the valve solenoid 224 will continue to maintain the valve 204 in an open position, and the process may return to step 412, during which the operator may continue to observe the discharge from the drain tube 216. If the timer has expired, the timer switch discontinues the open signal provided to the relay switch 308, and the relay switch allows the valve's solenoid 224 to close the drain valve 204. Alternatively, the timer switch may send a signal to the relay switch 308 to close the drain valve 204. The drain valve 204 is then closed (step 420).

At step 424, a determination is made as to whether water was detected or observed in the discharge from the drain tube outlet 232. If water (or in extreme circumstances oil) was observed in the discharge, it is an indication that the air dryer 108 should be serviced. Accordingly, after observing water or oil in the discharge, the air dryer 108 is serviced (step 428). As can be appreciated by one of skill in the art, servicing the air dryer may be performed by a mechanic or maintenance personnel after being informed of the condition by the operator. After servicing the air dryer, or if water was not observed in the discharge from the drain tube outlet 232, the process may end.

Figure 5A:
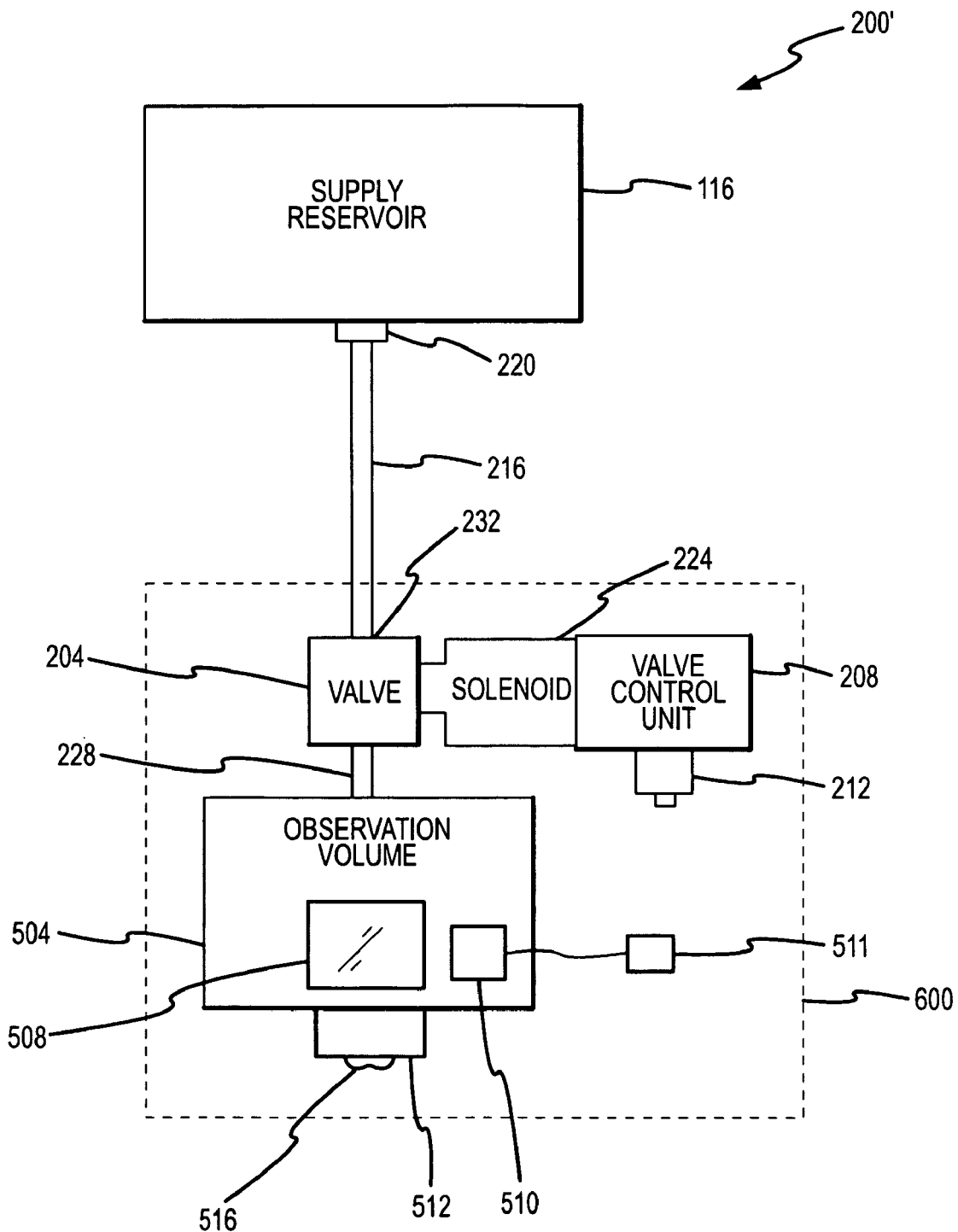
FIG. 5A is a schematic diagram of components of a system for determining the condition of an air dryer in accordance with embodiments of the present invention.

With reference to FIG. 5A components of a system 200' for determining the condition of an air dryer of a pneumatic system 100 in accordance with other embodiments of the present invention are illustrated. In general, the system 200' includes components similar to those included in connection with the system 200 illustrated in connection with FIG. 2, except that the arrangement of those components differs. In particular, the system 200' features a conduit 216 with a first end that is connected directly to the outlet 220 of the supply reservoir 116. Accordingly, the conduit 216 is always in communication with the supply reservoir 116 air volume. The second end or outlet 232 of the conduit 216 is interconnected to a drain valve 204. The drain valve 204 may be operated by an actuator comprising a solenoid 224, valve control unit or circuit 208, and activation switch 212. The outlet 228 of the drain valve 204 may be positioned proximate to or in the vicinity of the activation switch 212, so that the discharge from the outlet 228 when the valve 204 is opened can be easily observed by the operator.

A system 200' may additionally include an observation volume 504 that is in communication with the outlet 228 of the drain valve 204. The observation volume 504 may feature a sight glass or window 508, that facilitates the observation of moisture or oil in a discharge from the valve outlet 228 by an operator. In accordance with embodiments of the present invention, the sight glass or window 508 is positioned such that the operator can view at least a portion of the interior of the observation volume 504 through the sight glass or window 508 while or immediately after providing an input to the activation switch 212.

In accordance with further embodiments of the present invention, a moisture sensor 510 may be positioned to detect moisture in a discharge from the valve outlet 228. Furthermore, a moisture sensor 510 may be positioned within an observation volume 504. Examples of a suitable moisture sensor 510 include a conductive sensor that senses the presence of water between a pair of electrodes, a capacitive sensor that senses changes in capacitance between a pair of electrodes, or any other device capable of producing a signal indicating the presence of moisture in a discharge from a supply reservoir 116. An output signal from the moisture sensor 510 may be provided to an output device 511, to indicate to the operator that moisture has been detected in the discharge to alert the operator to a possible faulty air dyer 108 condition. Examples of an output device 511 include an indicator lamp, a textual message output, a buzzer, or some other visual and/or audio output device.

Figure 5B:
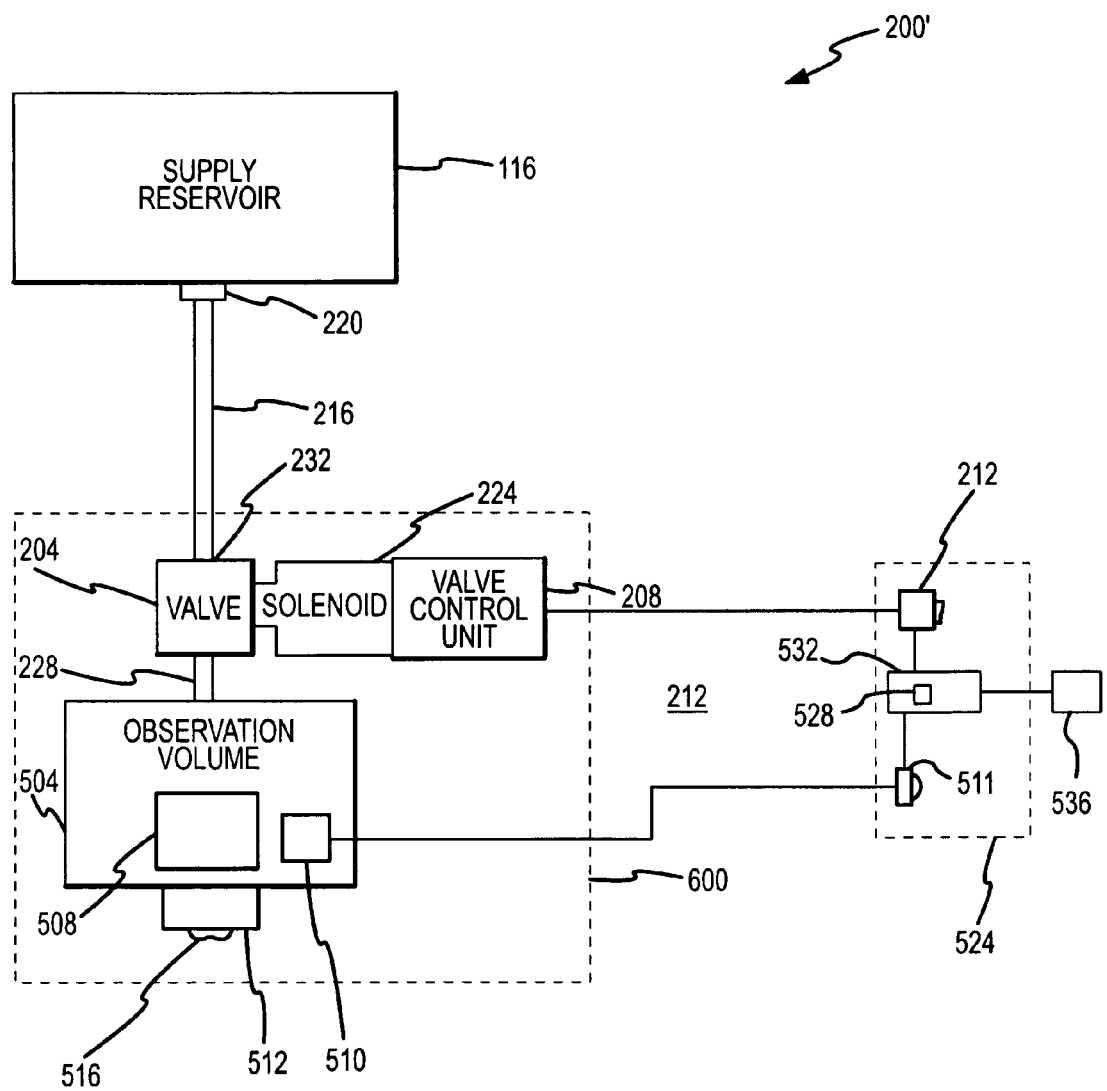
FIG. 5B is a schematic diagram of components of a system for determining the condition of an air dryer in accordance with other embodiments of the present invention.

With reference to FIG. 5B, and as can be appreciated by one of skill in the art after consideration of the present disclosure, embodiments in which a moisture sensor 510 in combination with an output device 511 are used can facilitate the installation and/or operation of a system 200' for determining the condition of a pneumatic system 100. For instance, an activation switch 212 and an output device 511 can be located in the cab 524 of a vehicle associated with the pneumatic system 100, or in some other location that is conveniently accessed by the operator, regardless of the distance to the supply reservoir 116, and without needing to run a conduit 216 to the operator observable location.

In addition, an exhaust port 512 fitted with an exhaust valve 516 may be provided to allow a discharge from the supply reservoir 116 to exit the observation volume 504 while preventing contaminants or other debris from entering the observation volume.

Figure 6:
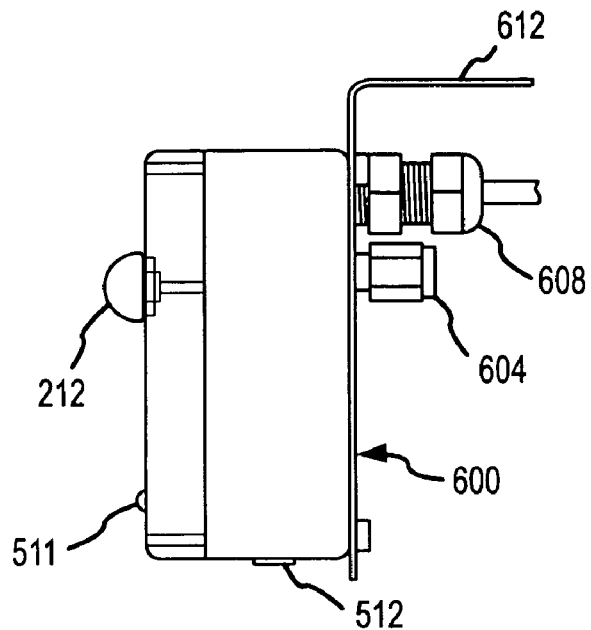
FIG. 6 is a side view of a system for determining the condition of an air dryer provided as an integrated unit in accordance with embodiments of the present invention.

In accordance with embodiments of the present invention, a system 200' may include a drain valve 204, solenoid 224, valve control unit 208, and activation switch 212 that are provided as part of an integrated unit 600. In accordance with further embodiments of the present invention, the integrated unit 600 may also include or provide an observation volume 504, a sight glass or window 508, and an exhaust port 512. In accordance with still other embodiments of the present invention, an integrated unit 600 may include a moisture sensor 510, in addition or as an alternative to a sight glass or window 508. An output device 511 that provides an indication to the operator that moisture has been detected in a discharge can be interconnected to the moisture sensor 510 and provided as part of the integrated unit 600. An example of such an integrated unit 600 is depicted in FIG. 6. As illustrated, the integrated unit 600 includes an inlet 604 that is adapted for connection to a conduit (e.g. conduit 216) that places the inlet 604 in communication with the supply reservoir 116. The integrated unit 600 additionally includes a receptacle 608 for receiving electrical power, for example from a battery 312. A switch 212 is provided as part of the integrated unit, for operating the drain valve 204. Alternatively, the switch may be located remotely with respect to the integrated unit 600. For example, the switch and an output device 511 can be located in an operator-accessible location that is remote with respect to the integrated unit 600. A mounting bracket 612 may also be included for mounting the integrated unit 600 in an operator-accessible location.

Figure 7:
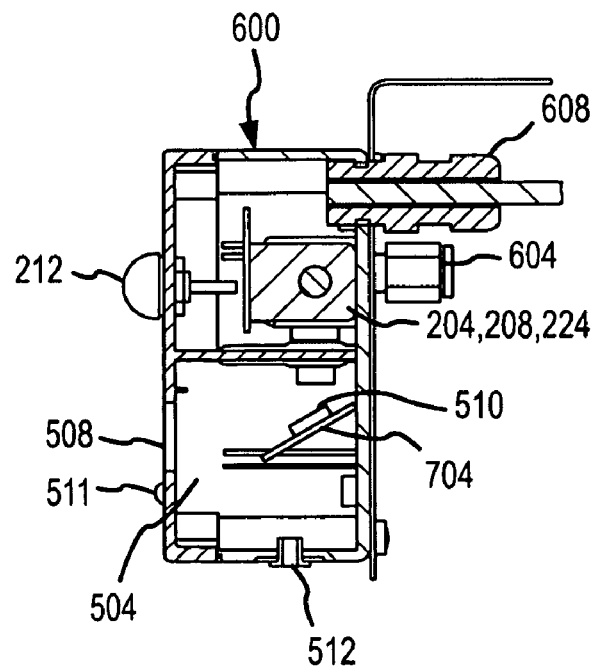
FIG. 7 is a cutaway view of the integrated unit of FIG. 6.

FIG. 7 is a cutaway view of the integrated unit 600 of FIG. 6. As seen in FIG. 7, the integrated unit may include a drain valve 204 with an integrated solenoid 224 and valve control unit 208 that receives power from a power source 312 such as a battery via the electrical power receptacle 608. The valve control unit 208 can be activated by an operator to hold the drain valve 204 open for a predetermined period of time by depressing or otherwise activating the switch 212. The discharge from the supply reservoir 116 passes through the valve outlet 228, which may communicate with an observation volume 504. The interior of the observation volume 504 may be viewed by the operator through a window or sight glass 508. In addition, a deflector plate or surface 704 may be provided to direct the discharge from the valve outlet 228 towards the window 508. As a result, any water or oil in the discharge can be observed by the operator. A moisture sensor 510, if provided, can be mounted to the deflector plate or surface 704, opposite the valve outlet 228, such that any moisture in the discharge from the valve outlet 228 can be detected by the moisture sensor 510. The observation volume 504 may include an exhaust port 512 that features an exhaust diaphragm or valve 516 that functions to allow the discharge to exit the observation volume 504, while preventing dirt from entering the observation volume 504.

Figure 8:
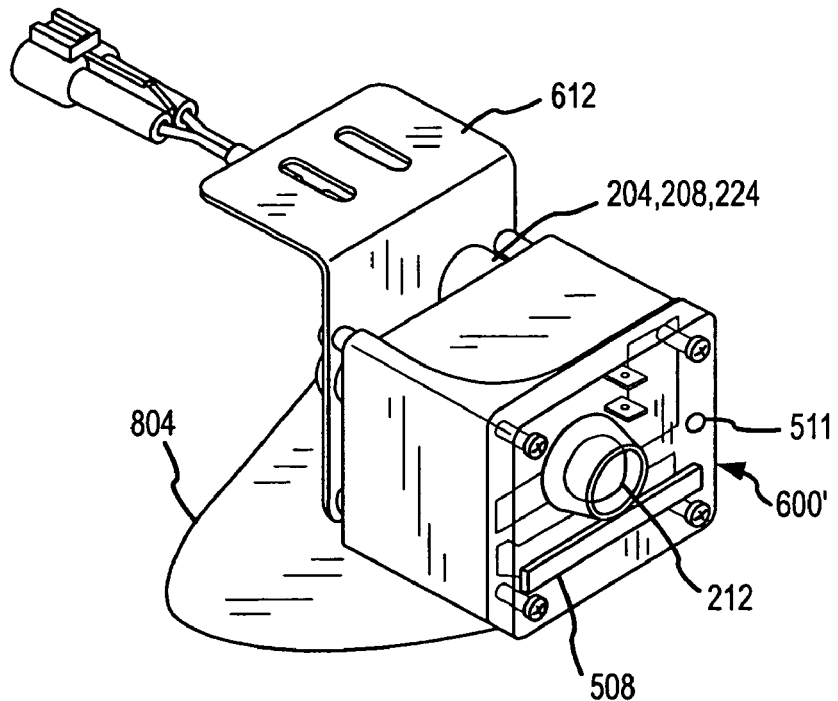
FIG. 8 is a perspective view of a system for determining a condition of an air dryer provided as an integrated unit in accordance with other embodiments of the present invention.
Figure 9:
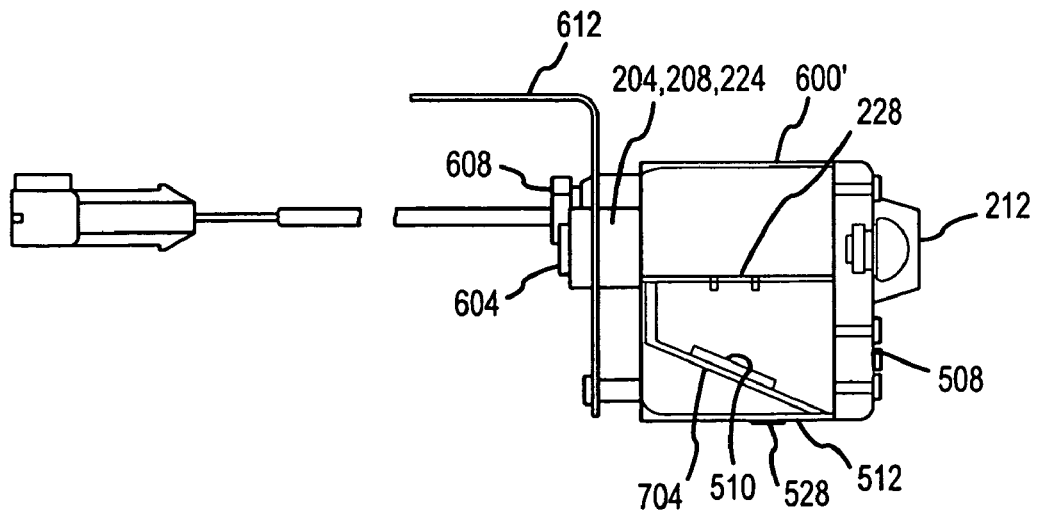
FIG. 9 is a cutaway view of the integrated unit of FIG. 8.

FIG. 8 illustrates an integrated unit 600' for use in draining pneumatic systems in accordance with other embodiments of the present invention. As shown in FIG. 8, the integrated unit 600' can include a fairing 804 to deflect spray and projectiles that might impact the unit 600', for example where the unit 600' is mounted to the exterior of a heavy truck or other vehicle. FIG. 9 is a cutaway view of the unit 600'. As shown, the unit 600' may include components of a system 200' in a compact assembly that can be mounted to the exterior of a vehicle, and that can provide a convenient means by which an operator can check for water in a supply reservoir 116 simply by installing the unit 600' such that it is interconnected to the supply reservoir 116 using a conduit 216. The installation of the unit 600' may be completed by also interconnecting the unit 600' to a battery or other source of electrical power 312.

Although embodiments of integrated units 600, 600' have featured solenoid 228 controlled valves 204 operated by electrical, operator-controlled switches 212, it should be appreciated that other arrangements are possible. For instance, an integrated unit 600, 600' can include a manually operated valve, particularly because the valve 204 is positioned proximate to the window 616 to the observation volume 612. More particularly, embodiments of the present invention allow the valve 204 to be opened by an operator while the operator is observing the discharge from the valve 204 through the window 616.

Figure 10:
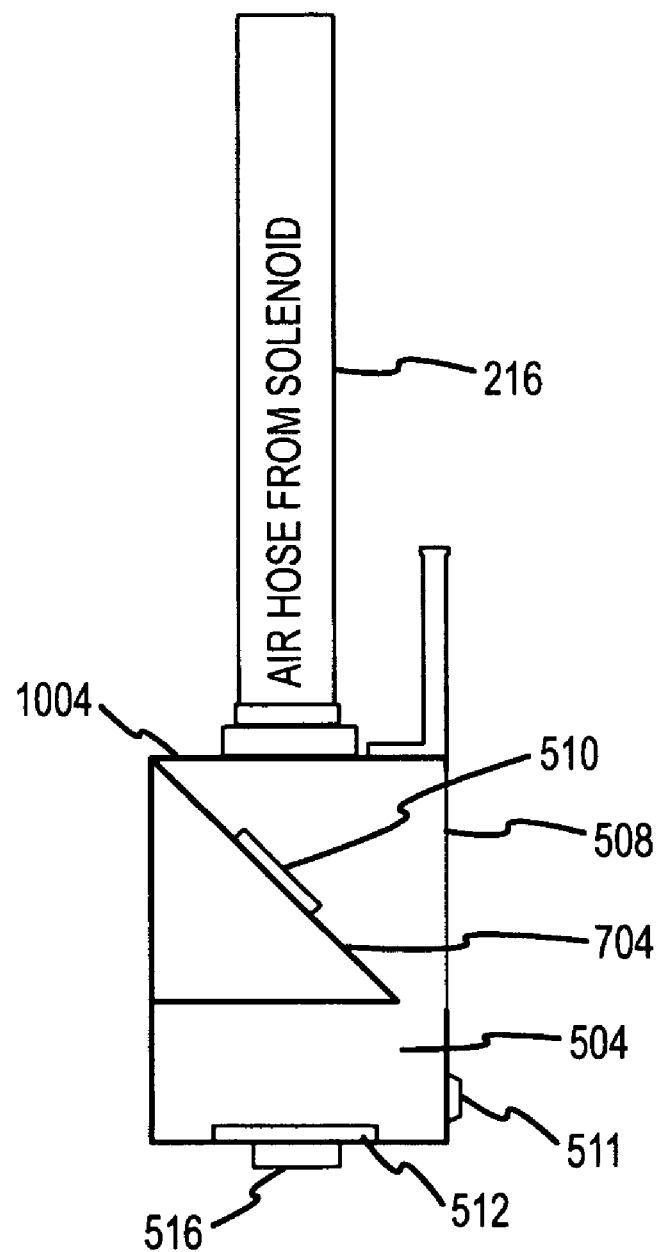
FIG. 10 is a cutaway view of an observation volume in accordance with embodiments of the present invention.

With reference now to FIG. 10, an observation volume 504 in accordance with embodiments of the present invention that is not integrated with a valve is illustrated. Instead, the observation volume 504 is provided as part of an observation unit 1004 that provides a deflector plate or surface 704 to direct a discharge from a conduit 216 towards a sight glass or window 508. Accordingly, the unit 1004 can provide an observation volume 504 to facilitate the viewing by an operator of moisture or oil in a discharge from a supply tank 116 where the drain valve 204 is, for example, mounted to the supply reservoir 116 directly or is otherwise separate from the observation volume 504. The unit 1004 may additionally include a moisture sensor 510 for generating a signal indicating that moisture has been detected in a discharge, an output device 511 that provides an indication to an operator that there is moisture in the discharge in response to a signal from the moisture sensor 510, and an exhaust outlet 512 incorporating or including an exhaust valve 516.

In accordance with still other embodiments of the present invention, a signal to open the drain valve 204 may be provided automatically. For example, a signal to open the drain valve 204 for a predetermined period of time may be provided to the valve control unit 208 each time the pneumatic system 100 is shut down. For instance, a signal to open the drain valve may be provided to the valve control unit 208 by a vehicle control or communication system 532 (see FIG. 5B) each time the ignition switch 536 of a vehicle associated with the pneumatic system is turned off. The control or communication system 532 may perform various functions, such as performing system or vehicle diagnostic or control procedures, including brake system diagnostics and control. Alternatively, the valve control unit 208 may monitor the ignition status of the vehicle and open the drain valve 204 in response to detecting that the ignition has been switched off. As another example, a signal to open the drain valve 204 may be provided to the valve control unit when a master power switch to a stationary pneumatic system 100 is turned off. As can be appreciated by one of skill in the art after consideration of the disclosure provided herein, embodiments in which the drain valve 204 is opened automatically can advantageously be combined with a system 200, 200' for determining the condition of an air dryer of a pneumatic system in which the discharge passed by the drain valve 204 while the drain valve 204 is being held open is observable by an operator who is positioned to take the action comprising shutting down the pneumatic system 100 (e.g. shutting off the ignition or turning off a master power switch). Alternatively, embodiments in which the drain valve 204 is opened automatically can advantageously be combined with a system 200, 200' for determining the condition of an air dryer of a pneumatic system in which the discharge passed by the drain valve 204 while the drain valve is being held open is detectable by a moisture sensor 510. As can also be appreciated by one of skill in the art, a system 200, 200' that provides for automatic opening of the drain valve 204 may continue to provide for manual operation of the drain valve 204, for example by operating the drain valve directly or through an activation switch 512 and any additional activation components (e.g. a valve control unit 208 and/or a solenoid 224).

As can further be appreciated by one of skill in the art after consideration of the disclosure provided herein, embodiments in which the drain valve 204 is automatically opened can be combined with a system 200' that includes a moisture sensor 510. According to such embodiments, an output device 511 to indicate to the operator whether moisture has been detected in the discharge passed by the drain valve 204 may be provided in a location that is observable by an operator who is positioned to take the action comprising shutting down the pneumatic system 100. For example, an output device 511 may be located in the cab 524 of a vehicle associated with the pneumatic system. Furthermore, the moisture sensor 510 can provide a signal to a memory 528, for example provided as part of a control or communication system 532 provided in association with the pneumatic system or as part of a vehicle that includes the pneumatic system 100, that can maintain a record of whether moisture was detected in the discharge passed by the drain valve 204 for later review. Additionally, the memory 528 can retain the record, and can cause an output device 511 to continue to provide a signal indicating that moisture has been detected, until the record is cleared by service personnel, for example as part of an air dryer 108 service procedure. The record maintained by the memory 528 may be simple, such as a bit that is set in response to receiving a signal from the moisture sensor 510. The record maintained by memory may also include additional information, such as the date and time when the signal from the moisture sensor 510 was received. Accordingly, control of and the output from a system 200, 200' can be integrated with vehicle or other system diagnostics, such as a control or communication system 532.

In accordance with still other embodiments of the present invention, a signal to open a drain valve 204 may be provided to more than one supply tank. For example, in the case of a tractor-trailer or semi, a supply tank is provided on the trailer, as well as the tractor. The supply tank on the trailer should, just like the supply tank on the tractor, be drained regularly. Accordingly, a signal to open the drain valve 204 of a supply tank 116 provided as part of a tractor's pneumatic system may also be provided to an interconnected trailer. The provision of the signal may be made through a communication bus or network used to pass other signals between the tractor and the interconnected trailer.

As can be appreciated by one of skill in the art from the description provided herein, the present invention provides a method and system or apparatus that facilitates the proper maintenance of pneumatic systems. In particular, the draining of the supply reservoir 116 provided as part of a pneumatic system 100 is facilitated by providing drain valve activation that is controlled by the operator of the pneumatic system 100 or in response to shutting down the system 100. In addition, the method and apparatus of the present invention provides for the routing of air and other material that may be released from the supply reservoir 116 by opening the drain valve 204 to a location at which it can be easily observed by the operator and/or at which a moisture sensor is positioned. Accordingly, proper maintenance is facilitated by making it easy for the operator to drain the system and to observe or detect the discharge from the system.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. An apparatus for determining the condition of an air dryer of a pneumatic system, comprising:
   a pneumatic valve including:
      a valve inlet, wherein the valve inlet is in communication with a pneumatic system supply reservoir;
      a valve outlet, wherein a discharge from the supply reservoir passes through the valve outlet when the pneumatic valve is open;
   a valve actuator interconnected to the pneumatic valve, wherein the valve actuator is operable to selectively open or close the pneumatic valve, and wherein the discharge from the pneumatic system supply reservoir passed by the valve outlet can be viewed by a person operating the valve actuator;
   a moisture sensor operable to detect the presence of water in a discharge from the pneumatic system supply reservoir; and
   an output device operable to provide an indication to an operator that there is moisture in the discharge in response to a signal from the sensor.

2. The apparatus of claim 1, further comprising:
   a conduit interconnecting an outlet of the supply reservoir to the valve inlet.

3. The apparatus of claim 1, further comprising:
   a valve stub at the valve outlet;
   a conduit having a first end interconnected to the valve stub and a second end open to the atmosphere, wherein the second end is located so that the discharge from the supply reservoir can be viewed by a person operating the valve actuator.

4. The apparatus of claim 1, wherein the valve actuator includes:
   a solenoid operable to selectively open or close the pneumatic valve;
   an operator switch; and
   a control circuit, wherein in response to a signal from the operator switch the control circuit operates the solenoid to open the pneumatic valve for a first predetermined period of time.

5. The apparatus of claim 1, further comprising;
   an observation volume in communication with the valve outlet;
   a window, wherein a person operating the valve actuator can view the discharge from the valve outlet through the window while the person is in position to operate the valve actuator.

6. The apparatus of claim 1, further comprising:
   a memory in communication with the moisture sensor, wherein in response to an output signal from the moisture sensor a record of the output signal is maintained in the memory.

7. The apparatus of claim 1, wherein the valve inlet is interconnected to an outlet of the pneumatic system supply reservoir.

8. An apparatus for determining the condition of an air dryer of a pneumatic system, comprising:
a pneumatic valve including:
a valve inlet, wherein the valve inlet is in communication with a pneumatic system supply reservoir;
a valve outlet, wherein a discharge from the supply reservoir passes through the valve outlet when the pneumatic valve is open;
a valve actuator interconnected to the pneumatic valve, wherein the valve actuator is operable to selectively open or close the pneumatic valve, and wherein the discharge from the pneumatic system supply reservoir gassed by the valve outlet can be viewed by a person operating the valve actuator;
wherein the pneumatic valve and the valve actuator are provided as part of an integrated unit, the integrated unit also including:
an observation volume;
a deflection surface within the observation volume; and
a window, wherein a discharge passed by the valve outlet when the pneumatic valve is open is deflected by the deflection surface towards the window, and wherein an interior of the observation volume can be viewed by a person operating the valve actuator through the window.

9. The apparatus of claim 8, further comprising:
an exhaust valve, wherein the discharge from the pneumatic system supply reservoir passed by the valve outlet into the observation volume exits the observation volume through the exhaust valve, and wherein material is prevented from entering the observation volume through the exhaust valve.

10. An apparatus for determining the condition of an air dryer of a pneumatic system, comprising:
a pneumatic valve including:
a valve inlet, wherein the valve inlet is in communication with a pneumatic system supply reservoir;
a valve outlet, wherein a discharge from the supply reservoir passes through the valve outlet when the pneumatic valve is open;
a valve actuator interconnected to the pneumatic valve, wherein the valve actuator is operable to selectively open or close the pneumatic valve, and wherein the discharge from the pneumatic system supply reservoir passed by the valve outlet can be viewed by a person operating the valve actuator;
a valve stub at the value outlet;
a conduit having a first end interconnected to the valve stub and a second end that is located so that the discharge from the supply reservoir can be viewed by a person operating the valve actuator, wherein said pneumatic system supply reservoir is mounted to a vehicle, and wherein the second end of the conduit is located proximate to the valve actuator.

11. A method for draining a pneumatic system reservoir to determine the condition of an air dryer, comprising:
placing an inlet to a pneumatic valve in communication with a volume of a pneumatic system supply reservoir;
providing a pneumatic valve actuator;
opening the pneumatic valve in response to a control input to the pneumatic valve actuator; and
directing a discharge from the pneumatic system supply reservoir such that it is sensed by a moisture sensor operable to detect moisture in the discharge;

in response to a signal from the moisture sensor indicating the presence of moisture, activating an output device to alert an operator to moisture in the pneumatic system.

12. The method of claim 11, wherein directing a discharge from the pneumatic supply reservoir further comprises directing the discharge such that it can be viewed by an operator , the method further comprising:
positioning one of an outlet of the pneumatic valve and an outlet of a conduit interconnected to the outlet of the pneumatic valve proximate to the pneumatic valve actuator, wherein the outlet of the pneumatic valve or the outlet of a conduit interconnected to the outlet of the pneumatic valve is in view of an operator when the operator is in a position from which the operator can operate the pneumatic valve actuator.

13. The method of claim 11, further comprising:
the operator observing a discharge of a the pneumatic system supply reservoir passed by the pneumatic valve.

14. The method of claim 11, wherein the operator provides the activation signal and observes the discharge while standing next to a heavy vehicle to which the pneumatic system reservoir is mounted.

15. A method for draining a pneumatic system reservoir to determine the condition of an air dryer, comprising:
placing an inlet to a pneumatic valve in communication with a volume of a pneumatic system supply reservoir;
providing a pneumatic valve actuator;
opening the pneumatic valve in response to a control input to the pneumatic valve actuator; and
directing a discharge from the pneumatic system supply reservoir such that it is sensed by a moisture sensor, operable to detect moisture in the discharge;
providing the control input for the pneumatic valve from a control system.

16. The method of claim 15, further comprising:
providing the control input for the pneumatic valve in response to detecting that an ignition of a vehicle associated with the pneumatic system has been switched off.

17. A system for determining the condition of an air dryer of a pneumatic system, comprising:
a pneumatic valve having an input and an output, wherein in an open mode the input of the pneumatic valve is in communication with the output of the pneumatic valve;
an actuation switch, wherein the actuation switch is operable to place the pneumatic valve in the open mode in response to an input;
an observation volume, wherein the observation volume is in communication with the output of the pneumatic valve;
a window proximate to the actuation switch, wherein when the pneumatic valve is in the open mode a discharge from the pneumatic system passed through the pneumatic valve is visible to an operator, wherein at least a portion of the observation volume is visible to the operator through the window;
a deflection surface, wherein the discharge from the pneumatic system passed though the pneumatic valve when the pneumatic valve is open is deflected towards the window;
a moisture sensor mounted to the deflection surface; and
an output device, wherein the output device provides an operator perceivable output in response to a signal from the moisture sensor indicating the presence of moisture in a discharge from a pneumatic system passed through the pneumatic valve.

18. The system of claim 17, wherein the deflection surface and the moisture sensor are located at least one of proximate to the outlet of the pneumatic valve and proximate to a conduit in communication with the outlet of the pneumatic valve.

19. The system of claim 17, wherein the pneumatic valve, the actuation switch, the window, the deflection surface, the observation volume, the moisture sensor, and the output device comprise components provided as part of an integrated unit.

20. The system of claim 19, further comprising:
a bracket, wherein the integrated unit is mounted to a vehicle by the bracket.

21. The system of claim 17, further comprising:
an exhaust valve, wherein the exhaust valve is operable to allow a discharge passed by the pneumatic valve to exit the observation volume, and wherein the exhaust valve is further operable to prevent the entry of debris into the observation volume though the exhaust valve.

22. The system of claim 17, wherein the actuation switch comprises a momentary switch and a timing circuit operable to hold the pneumatic valve open for a predetermined period of time after an input to the momentary switch is received from an operator.

23. The system of claim 17, further comprising:
a conduit interconnecting the inlet of the pneumatic valve to a supply reservoir volume.

24. The system of claim 17, further comprising:
a control system, wherein the input to the actuation switch to place the pneumatic valve in the open mode is provided by the control system.

25. The system of claim 17, wherein the input to the actuation switch to place the pneumatic valve in the open mode comprises turning off an ignition of a vehicle associated with the pneumatic system.

26. The system of claim 17, wherein the deflection surface is proximate to the outlet of the pneumatic valve.

* * * * *